Aug. 20, 1935.   F. J. FUSS   2,012,041

BEAN THRESHING MACHINE

Filed Jan. 2, 1934   3 Sheets-Sheet 1

INVENTOR
Fredrick J. Fuss.
BY
ATTORNEY

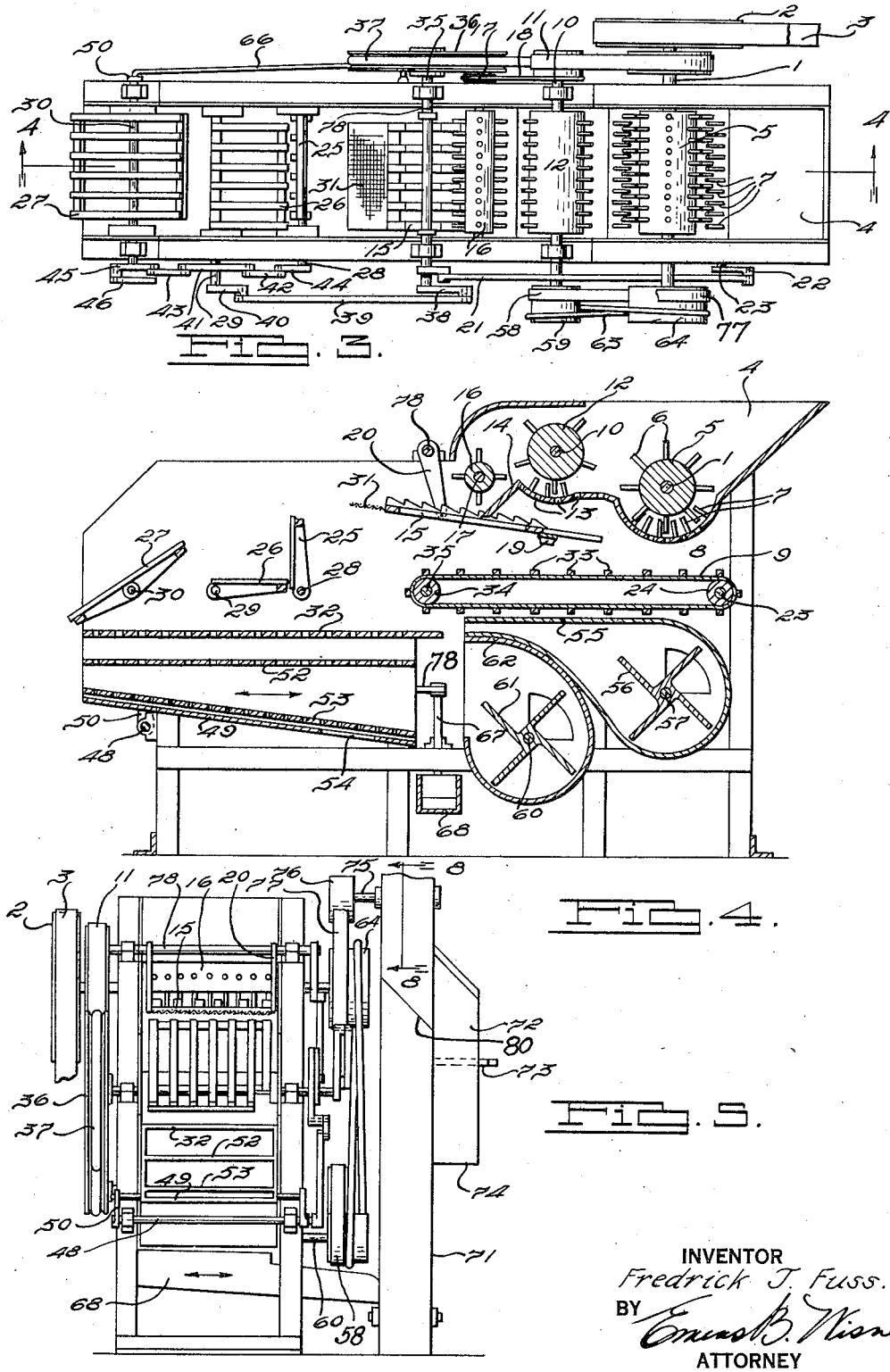

Aug. 20, 1935.  F. J. FUSS  2,012,041

BEAN THRESHING MACHINE

Filed Jan. 2, 1934  3 Sheets-Sheet 3

INVENTOR
Fredrick J. Fuss.
BY
ATTORNEY

Patented Aug. 20, 1935

2,012,041

UNITED STATES PATENT OFFICE 2,012,041

BEAN THRESHING MACHINE

Fredrick J. Fuss, New Boston, Mich.

Application January 2, 1934, Serial No. 704,909

1 Claim. (Cl. 130—27)

This invention relates to bean threshing machines and the object of the invention is to provide a machine having a hopper into which bean plants may be thrown and which will shred the plants and break up the bean pods and will separate the beans from the hay and discharge the beans to a conveyer from which the beans may be sacked.

Another object of the invention is to provide a bean threshing machine in which the beans are separated from the hay and other foreign matter and are then screened and while being screened, air currents are blown therethrough to carry off the finer foreign matter from the beans and the cleaned beans are carried to a conveyer which discharges the beans into a sacking device.

Another object of the invention is to provide a compact and comparatively cheap bean threshing machine which has all the advantages of the larger bean threshing machines.

A further object of the invention is to provide an arrangement whereby the hay is discharged at one point from the machine while the beans are discharged at another point and the finer foreign matter and cull beans are discharged at another point.

A further object of the invention is to provide a bean threshing machine in which all of the parts are driven from a single pulley to which the power is applied.

These objects and the several novel features of the invention are hereinafter more fully described and claimed and the preferred form of construction by which these objects are attained is shown in the accompanying drawings in which—

Fig. 3 is a plan view of the machine.

Fig. 4 is a longitudinal section taken on line 4—4 of Fig. 3.

Fig. 5 is an elevation of the hay discharge end of the machine.

Figure 2:
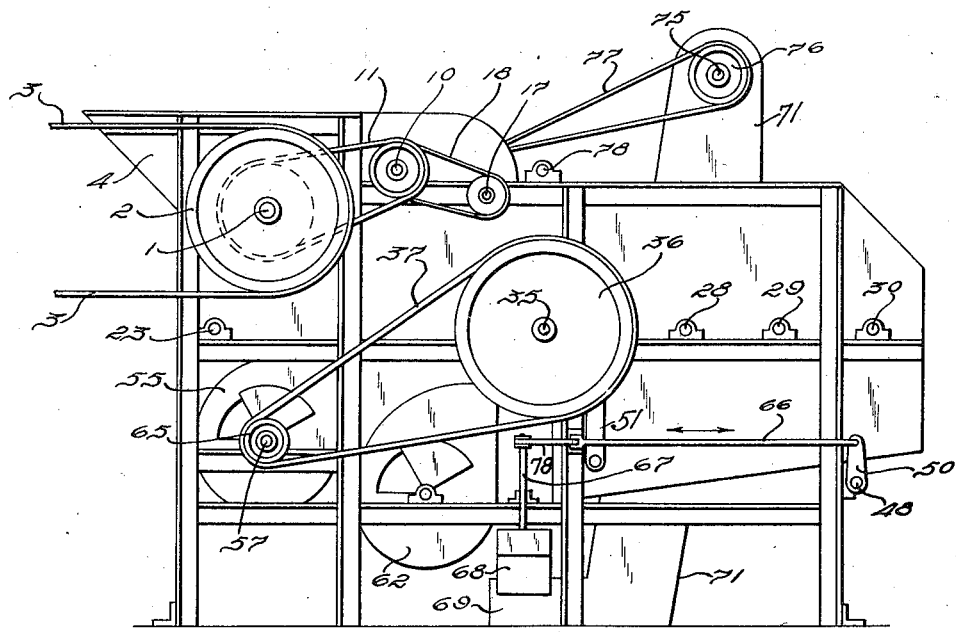
Fig. 2 is an elevation of the opposite side thereof.

As shown in Figs. 2 and 3, a shaft 1 is provided for the machine having a drive pulley 2 adapted to be driven by a belt 3 from a suitable source of power such as a gasoline engine or the like or a motor may be connnected to drive the shaft 1 direct, if desired. As shown in Fig. 4 a hopper 4 is provided into which the bean plants may be thrown and a drum 5 is attached to the shaft 1 within the hopper 4 and is provided with spikes 6 adapted to pass between the spikes 7 in the bottom of the hopper to shred the bean pods and bean plants. Beneath the drum 5, the hopper is provided with openings 8 through which the loosened beans may drop onto the belt 9.

Figure 1:
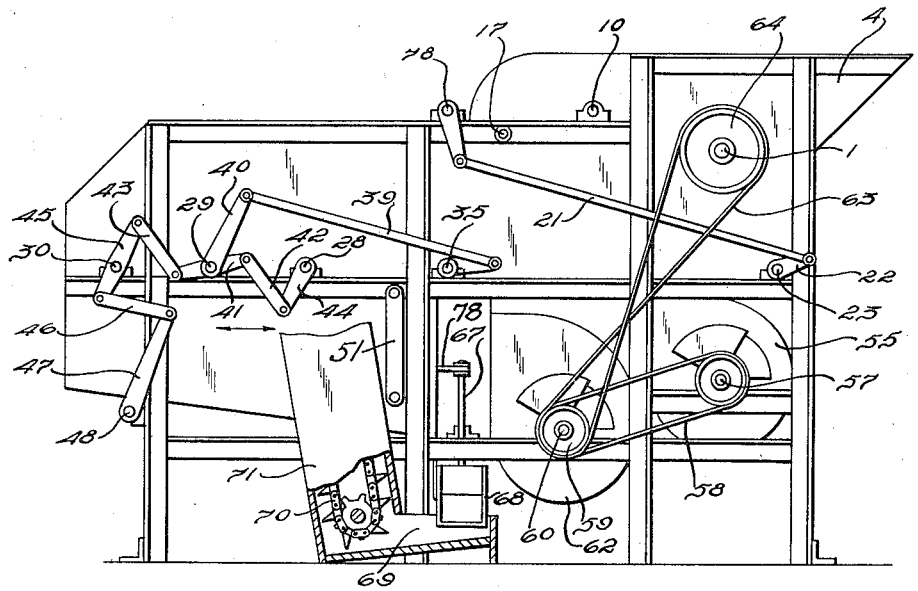
Fig. 1 is an elevation of one side of a bean threshing machine embodying my invention.

As shown in Figs. 1 and 2, a second shaft 10 extends through the hopper and is driven by a belt 11 from a pulley on the shaft 1 and on this shaft 10 a shredding drum 12 is provided adapted to further shred the plants and the beans from this shredding operation may pass through the apertures 13 in the bottom of the hopper onto the belt 9. At the end, the bottom of the hopper is provided with a sloping partition 14 having end portions or teeth extending between the toothed bars of a vibrator rack 15. The shredded bean plants thrown into the hopper are discharged from the shredding drum 5 to the shredding drum 12 and thence to a feeding drum 16 on the shaft 17 which is driven by a belt 18 from the shaft 10. This feeds the shredded material onto the rack 15 which is slidably supported on the guide 19 and is vibrated longitudinally by the arm 20 secured to the shaft 73 which is oscillated by means of a rod 21 shown in Figs. 1 and 6 which is given an oscillating movement by means of the arm 22 attached to a shaft 23 which shaft extends through the roller 24 attached thereto and driven by the belt 9. This rack 15 is thus given a vibratory longitudinal movement to fluff the shredded material and at the same time the feeder drum 16 feeds the material longitudinally of the toothed frame members of this rack. The rack 15 is provided with a wire screen 31 extending from the end thereof over which the material passes during feeding and the material falls off from this end of the rack 15 onto the discharge racks. There are three discharge racks provided 25, 26, and 27 which are shown in Figs. 3, 4, 5, and 7.

Figure 6:
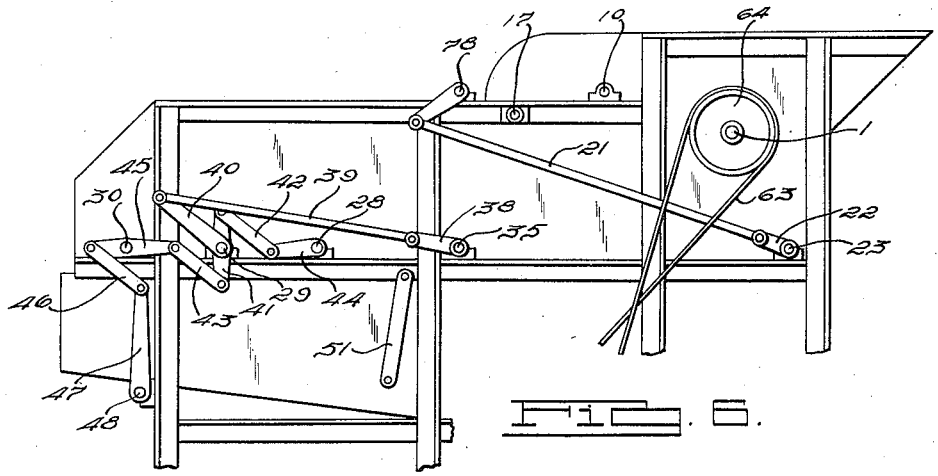
Fig. 6 is a view similar to Fig. 1 showing the movement of the hay discharge mechanism.

The discharge rack 25 is secured to a shaft 28 while the discharge rack 26 is secured to a shaft 29 and the discharge rack 27 is secured to a shaft 30. These racks swing on their axes from the position shown in Fig. 4 to the position shown in Fig. 7 and thence back to the position shown in Fig. 4. As will be understood from Fig. 4, the material falls onto the rack 25 which is formed from longitudinal slats and by the turning of this rack to the position shown in Fig. 4, the material is thrown onto the rack 26 which turns to the position shown in Fig. 7 and throws the material onto the rack 27 which when turned to the position shown in Fig. 4 discharges the hay from the end of the machine. By thus tossing the hay with these discharge racks, the hay is fluffed to allow the remaining beans to fall onto the screen 32, onto which beans are also discharged by the conveyer belt 9 which is provided with transverse slats 33 which carry the beans to the screen 32. This belt 9 at the discharge end is provided with a roller 34 secured to the shaft 35 and as shown in Fig. 2 a pulley 36 is secured to the shaft 35 and is driven by the belt 37. The opposite end of this shaft 35 is provided with an arm 38 shown in Fig. 6 which, during rotation of the shaft, oscillates a rod 39 connected to an arm 40. This arm 40 is secured to the shaft 29 and an arm 41 is secured to this shaft 29 and is provided with arms 42 and 43 connected to opposite ends thereof which oscillate the shafts 28 and 30 by means of the arms 44 and 45. By this arrangement, the movement of the discharge racks from the position shown in Fig. 4 to that shown in Fig. 7 is accomplished and the movement of the various arms to move the discharge racks is illustrated in Figs. 1 and 6.

As arm 46 is pivotally connected to the free end of the arm 45 and in turn is pivotally connected to an arm 47 which is secured to the shaft 48. This shaft 48 as shown in Fig. 7 extends beneath the screen box 49 and is provided with a short arm 50 which is pivotally connected to the screen box 49. At the forward end, this screen box is pivotally supported by a swinging arm 51 so that by oscillation of the arm 47 during oscillation of the arm 45, the shaft 48 and arm 50 are oscillated to vibrate the screen box so that the beans pass through the screen 32 and through the screen 52 onto the screen 53 near the bottom of the box. The screen 53 is provided with small openings so that normal size beans cannot pass therethrough but this screen allows culled beans, sand and small foreign particles to pass therethrough onto the bottom of the box 49 which is provided with a discharge slot 54 through which this waste material falls.

Figure 7:
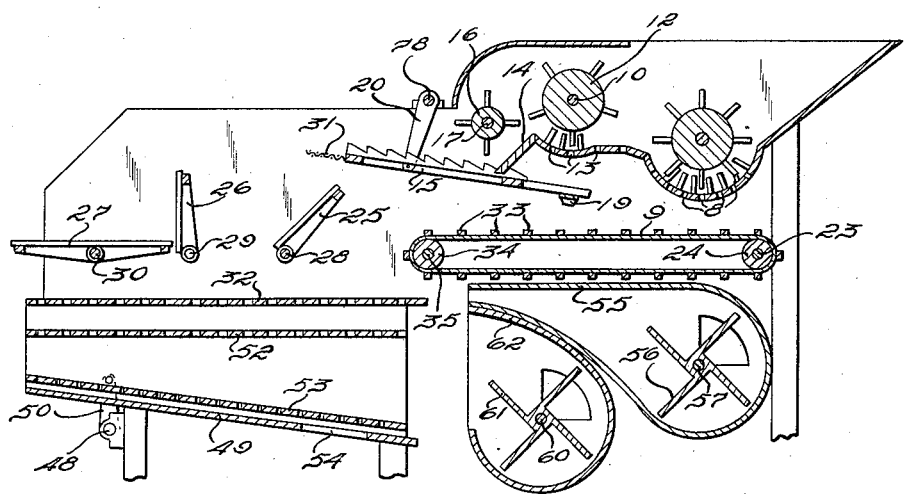
Fig. 7 is a view similar to Fig. 4 showing the movement of the discharge racks in discharging the hay.

A blower housing 55 is provided as shown in Fig. 7 beneath the belt 9 and is adapted to blow a continuous current of air over the top of the screen 32 so as to blow all fine particles and waste material off from this screen as the beans are discharged thereon from the discharge rack and from the belt 9. This blower may be of any conventional type and comprises a fan 56 secured to the shaft 57 and this shaft as shown in Fig. 1 is driven by a belt 58 from the pulley 59. The pulley 59 is secured to a shaft 60 and this shaft as shown in Fig. 7 is provided with a conventional fan 61 adapted to blow air from the housing 62 through the screen box to blow the dust and fine particles out of this box as the beans and dust fall therethrough during vibrating action of the screen box.

This shaft 60 is driven by means of a belt 63 shown in Figs. 1, 3, 5, and 6 from a pulley 64 secured to the main drive shaft 1. By this arrangement, both fans are driven and the shaft 57 for the fan 56 is provided with a pulley 65 shown in Fig. 2 and this pulley drives the belt 37 and shaft 35 to drive the belt 9 and the mechanism shown in Fig. 6 for operating the discharge racks.

Figure 8:
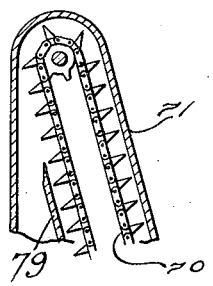
Fig. 8 is a section taken on line 8—8 of Fig. 5.
Figure 9:
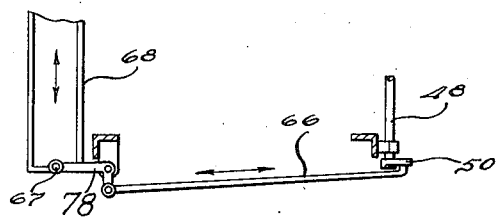
Fig. 9 is a plan view of the bean trough shaker also shown in Fig. 2.

The oscillating arm 58 for vibrating the screen box is shown more particularly in Figs. 2 and 9 and a rod 66 connects this arm with a bell crank 78 and with an arm 67 which is connected to the bean discharge trough 68 to vibrate this trough longitudinally. This trough as shown in Figs. 1, 4, and 5 is positioned beneath the discharge end of the screen box so that the beans fall therein and travel down the sloping bottom of this discharge trough into a hopper 69 from which they are carried upwardly by the chain conveyer 70 through the housing 71 and are discharged behind the partitions 79 and 80 shown in Figs. 5 and 8 into a compartment 72 having a shut-off slide 73 and provided with an open lower end 74 to which a sack may be secured to receive the beans. When the sack is attached over this opening 74, the slide 73 may be drawn out to allow the beans to fall into the sack. The conveyer 70 is driven at the upper end by means of a shaft 75 to which a pulley 76 is secured and this pulley 76 is connected by means of a belt 77 to the pulley 64 on the shaft 1 as shown in Figs. 1 and 5.

By changing the screens in the screen box and the spacing of the teeth in the shredders the machine may be arranged for threshing any of the ordinary grains.

From the foregoing description, it becomes evident that the device is very efficient in operation, will provide a compact and comparatively cheap machine for threshing beans or other grain, will deliver absolutely clean beans to the discharge trough and provide a device which accomplishes the objects described.

Having thus fully described my invention, its utility and mode of operation, what I claim and desire to secure by Letters Patent of the United States is—

In a bean threshing machine, a hopper, a pair of shredding drums rotatably mounted in the hopper and having a series of radially extending pegs, a series of pegs extending upwardly from the bottom of the hopper beneath each shredding drum, the hopper bottom being provided with a multiplicity of bean apertures adjacent to and between the pegs, a horizontal conveyer belt beneath the hopper, a sloping shaker having the lower end extending between the hopper and the conveyer belt and the upper end extending beyond the hopper, a series of discharge racks, means for oscillating the discharge racks on their axes, the upper end of the shaker discharging onto the first of the series of discharge racks, means for oscillating the shaker, a screen box positioned beneath the discharge racks and having a series of screens therein, the horizontal conveyer belt extending over the upper edge of the screen box to discharge thereonto, a pair of blowers mounted beneath the conveyer belt and arranged to blow air through and over the screen box and the screen box being provided with a sloping bottom, means for vibrating the screen box and a trough into which the sloping bottom of the screen box discharges.

FREDRICK J. FUSS.